Oct. 8, 1957  C. W. JOHNSON  2,808,651
CALIPER FOR A LENS OR THE LIKE
Filed May 28, 1956
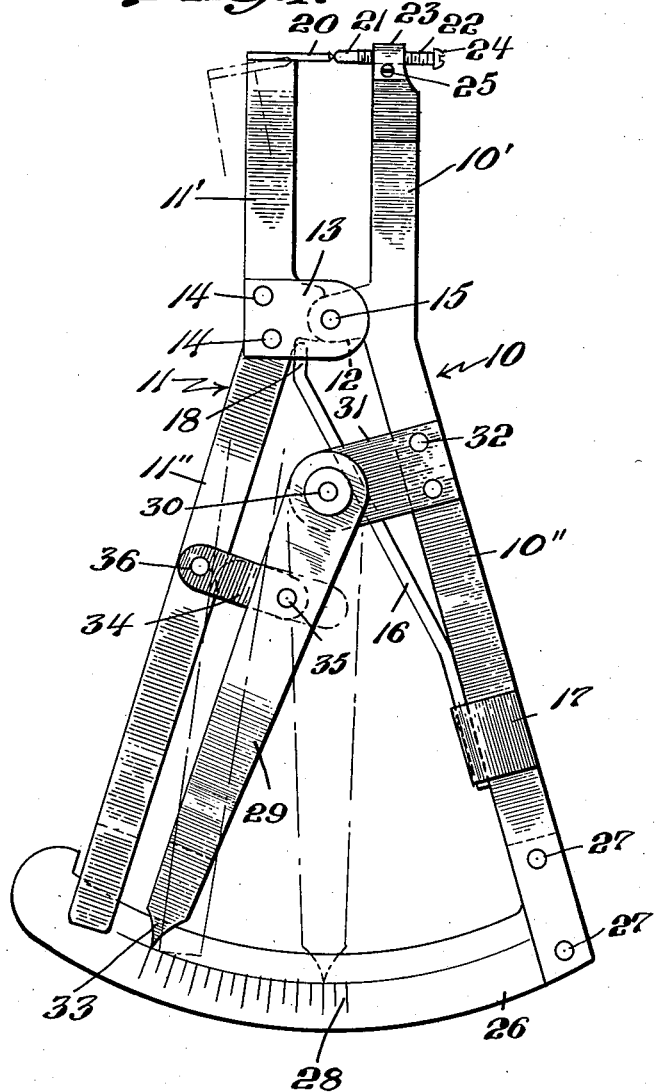
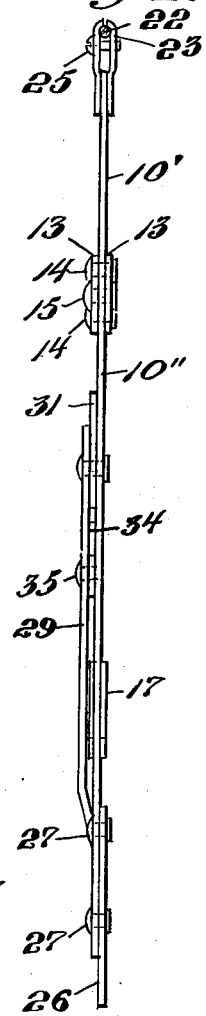
INVENTOR.
Charles W. Johnson
BY
Barlow & Barlow
ATTORNEYS.

United States Patent Office 2,808,651
Patented Oct. 8, 1957

2,808,651

CALIPER FOR A LENS OR THE LIKE

Charles W. Johnson, Rehoboth, Mass., assignor to Sadler Bros., Inc., a corporation of Massachusetts Application May 28, 1956, Serial No. 587,706

4 Claims. (Cl. 33—149)

This invention relates to a caliper of the type used for measuring the thickness and diameter of a lens and may have other uses for measuring articles of a similar size.

Heretofore it has been usual to pivot two arms together so that the distance between the pivot of the arms and one end of the arms will be about four times the distance from the pivot to the other end of the arms. A scale is provided on the longer side of the arms from the pivot, and one of the arms acts as a pointer movable over that scale to indicate the distance between the ends of the shorter portion of the arms which usually have inwardly extending portions.

In the use of this instrument a person will hold the same in his hand for a good part of the time that the grinding operation on the lens occurs, and consequently it is desirable that the device be easily held in the hand. Recently the size of the lenses being used has increased, and the distance from the pivot to the measuring end of the caliper does not permit of the larger size lenses being calipered. To increase the size of the caliper by use of the same construction so that the distance from the pivot to the measuring end was sufficient to take the lens and to correspondingly increase the length of the arms on the other side of the pivot would result in a rather ungainly device and one which would be objectionable to the person who has been accustomed to the smaller instrument.

One of the objects of this invention is to provide an instrument which may maintain substantially the same over-all length but which will permit of a greater distance from pivot to the measuring end of the caliper arms without proportional increase of the arms on the other side of the pivot, and yet there will be provided a measurement indication in millimeters which may be easily read.

More specifically an object of this invention is to provide a pointer and multiply the movement of the pointer so as to obtain the desired reading without the increase in the length of the arm which would heretofore have been necessary if the structure previously provided were utilized.

With these and other objects in view, the invention consists of certain novel features of construction as will be more fully described and particularly pointed out in the appended claims.

In the accompanying drawings:

Figure 1 is a plan view of the instrument constructed in accordance with this invention; and Figure 2 is an edge view thereof.

In proceeding with this invention, I have provided two arms from sheet stock which lie substantially in the same plane and have pivoted these arms one to the other intermediate their length and nearer one end than the other providing on the short side of the arm portions from the pivot to their ends a sufficient distance to accommodate lenses of the desired diameter. On the other side of the pivot and along the longer arm portion from the pivot to its end I provide a spring which forces the arms about the pivot to cause the shorter end portions of the arms to move toward each other. Also I provide a pointer which is pivoted relative to one of the arms while a link on the other arm moves its pointer about its pivot over a scale carried by the first arm so that the distance that the shorter ends of the arms are apart may be read from the scale. In this case the movement of the pointer is multiplied, causing it to move a much greater distance than the ends of either of the arms will move relative to each other at the distance of the scale from the pivot.

With reference to the drawings, I provide a first arm 10 and a second arm 11 from sheet stock, the first arm having a finger 12 extending toward the other arm 11 with an opening therein. The second arm has two ears 13—13 secured to the arm 11 by rivets 14—14, and these ears are provided with registering openings which register with the opening in the finger 12. A pivot pin 15 passes through these registering openings having a head on either end so as to provide a rivet holding the arms in pivotal relation. The finger 12 is in the same plane as the stock of the remainder of the arm, while the ears 13 overlap the arm 11. Thus, the arms are located in the same plane with one another. The arms and ears providing the pivot are so located as to provide short arm portions 10' on one side of the pivot and long arm portions 10" on the other side of the pivot. Similarly short arm portions 11' and long arm portions 11" are provided on the arm 11. A flat spring 16 is clamped to the arm portion 10" by a band 17 and is so shaped as to provide a portion 18 to engage the arm portion 11" adjacent the pivot so as to urge the arm portions 10", 11" apart and the portions 10' and 11' toward each other.

The arm portion 11' is provided with a fixed contact 20 secured to its end, while the arm portion 10' is provided with an adjustable contact 21 which comprises a screw 22 having threaded engagement with the split bearing 23 so that it may be adjusted by means of its slotted head 24 through this bearing 23 and may be locked in position by a screw 25 which engages either portion of the split bearing so as to squeeze the bearing tightly upon the screw and prevent relative movement of the screw and bearing after zero adjustment is obtained.

The arm portion 10" has an arcuate plate 26 secured to its lower end as by means of rivets 27 and is provided with indicia 28 for desired calibration thereon. A pointer 29 is pivoted at 30 on the bracket 31 secured by rivets 32 to the arm portion 10" and is tapered as at 33 to cooperate with the indicia 28 on the scale plate 26. This pointer 29 is connected to the arm portion 11" by a link 34 pivoted as at 35 on the pointer and 36 on the arm portion 11" so that as the arm 11 moves with reference to the arm 10, a movement will be caused of the pointer 29. The pivot 30 of the pointer being nearer to the scale plate 26 than is the pivot 15 of the arm 11 will cause the pointer to move a greater distance over the scale plate than the arm portion 11". Thus, the movement will be multiplied and a reading, usually in millimeters, may be read directly from the scale which may be made sufficiently large to be easily seen and the entire length of the scale may be utilized with the scale located closer to the pivot 15 than has heretofore been possible in the constructions previously known.

I claim:

1. A caliper for measuring lens and the like comprising a pair of arms pivotally mounted to each other a substantial distance from the ends thereof, the arm portions on one side of the pivot being longer than the arm portions on the other side of said pivot, said longer portions providing a pair of handles, said handles being movable toward each other for swinging the shorter arm portions away from each other, a spring acting between said arms to swing the shorter arm portions toward each other, a bracket extending inwardly from one of said handles, a scale secured at one end thereof to the said one of said handles and extending therefrom toward the other of said handles, a pointer pivotally secured to said bracket and movable over said scale, and a link connected to the pointer and the said other of said handles for moving said pointer over said scale upon relative moving of said handles toward each other, said handles being normally held spaced apart by said spring and said pointer extending in the space between said handles at all distances of spacing of said handles.

2. In a caliper as set forth in claim 1 wherein said bracket is positioned inwardly of the midpoint of said handle portions and said pointer extends from said bracket toward the outer ends of said handle.

3. In a caliper as set forth in claim 1 wherein said link is pivotally connected to said pointer at a location thereon between the pivot and the free end thereof.

4. In a caliper as set forth in claim 1 wherein said scale is secured to the end portion of said one of said handles and extends on a radius described from the pivot of the pointer.

References Cited in the file of this patent

UNITED STATES PATENTS

| | | |
|---|---|---|
| 454,569 | Dyson | June 23, 1891 |
| 1,328,651 | Eames | Jan. 20, 1920 |
| 1,692,014 | Winn | Nov. 20, 1928 |

FOREIGN PATENTS

| | | |
|---|---|---|
| 77,684 | Germany | Nov. 2, 1894 |